United States Patent [19]
Brown et al.

[11] Patent Number: 5,325,529
[45] Date of Patent: Jun. 28, 1994

[54] EXTERNAL BOOT INFORMATION LOADING OF A PERSONAL COMPUTER

[75] Inventors: Norman P. Brown, Tomball; James D. Williams, Jr., Cypress; Donald P. Clary; James H. Nuckols, both of Houston, all of Tex.

[73] Assignee: Compaq Computer Corporation, Houston, Tex.

[21] Appl. No.: 526,036

[22] Filed: May 18, 1990

[51] Int. Cl.$^5$ .............................................. G06F 9/445
[52] U.S. Cl. ............................ 395/700; 364/DIG. 2; 364/940.4; 364/940.8; 364/940.81; 364/975.2; 364/975.1
[58] Field of Search ............................ 395/650, 700; 364/940.4, 940.8, 940.7, 975.2, 940.81, 975.1

[56] References Cited

U.S. PATENT DOCUMENTS

| 5,032,989 | 7/1991 | Tornetta ............................ 364/401 |
| 5,142,680 | 8/1982 | Ottman et al. ..................... 395/700 |
| 5,146,568 | 9/1992 | Flaherty et al. .................... 395/325 |

OTHER PUBLICATIONS

Dvorak, John C. "Dvorak's Guide to PC Telecomm." 1990, pp. 425–438.
Honig, David, Hoover, Kenton *Desktop Communications*, 1990, pp. 152–185.

Primary Examiner—Gareth D. Shaw
Assistant Examiner—A. Katbab
Attorney, Agent, or Firm—Pravel, Hewitt, Kimball & Krieger

[57] ABSTRACT

A computer system which can receive boot information over a parallel or serial port. The ports are inspected for activity prior to attempting to boot from a floppy or hard disk. If there is activity on the port the sequence being received is read and compared to a predetermined identification sequence. If a match is made, an acknowledgement character is transmitted. A communication sequence commences to transfer the boot information over the link. After the transfer is complete, the boot information is executed. The serial transfer utilizes the conventional serial lines, while the parallel transfer is performed a nibble at a time. This nibble mode allows use of only outputs to inputs to avoid dual source driving problems.

14 Claims, 14 Drawing Sheets

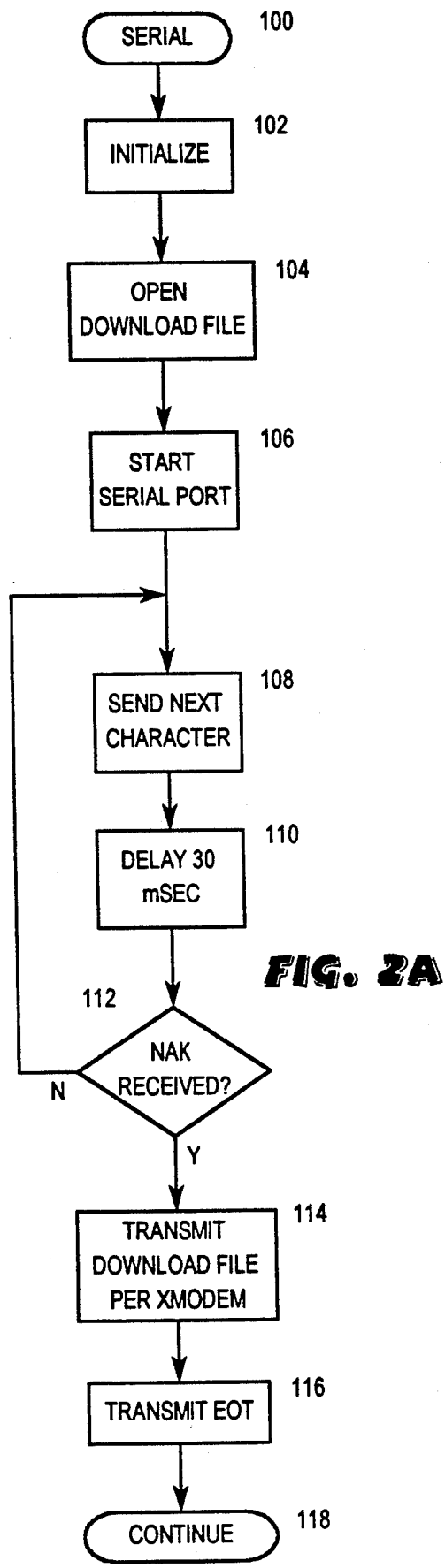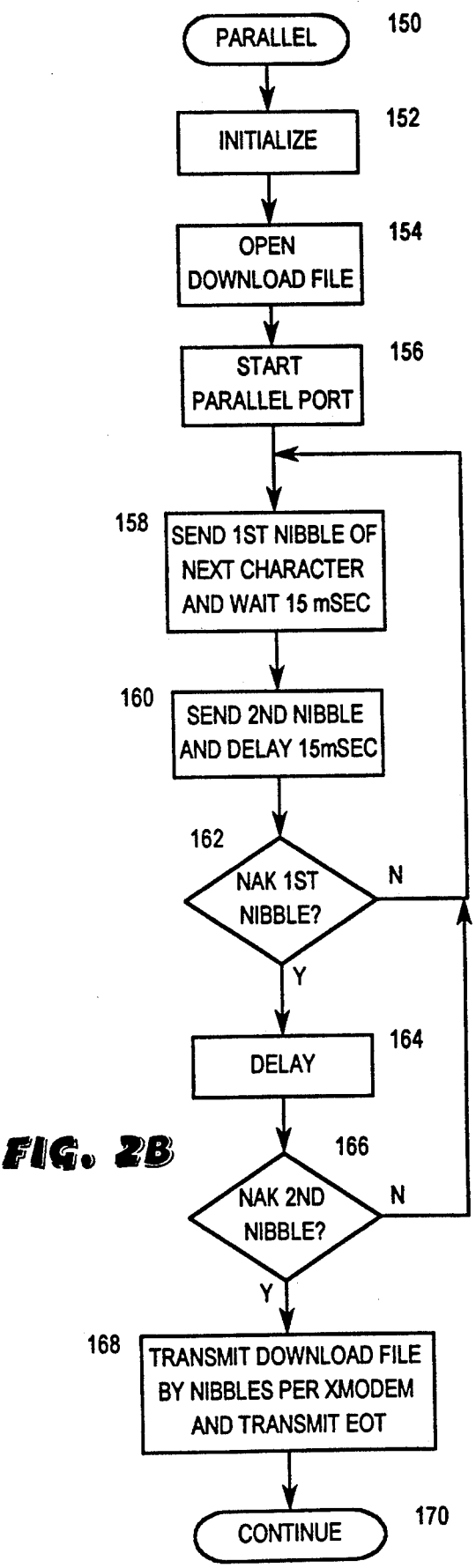
FIG. 2A
FIG. 2B

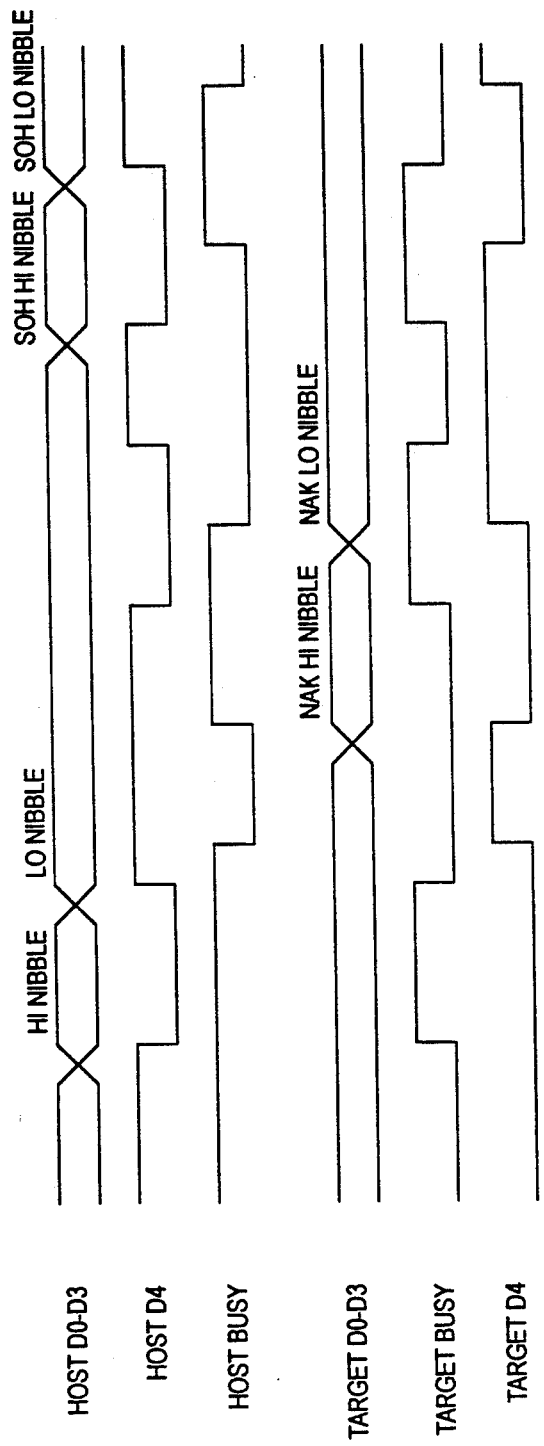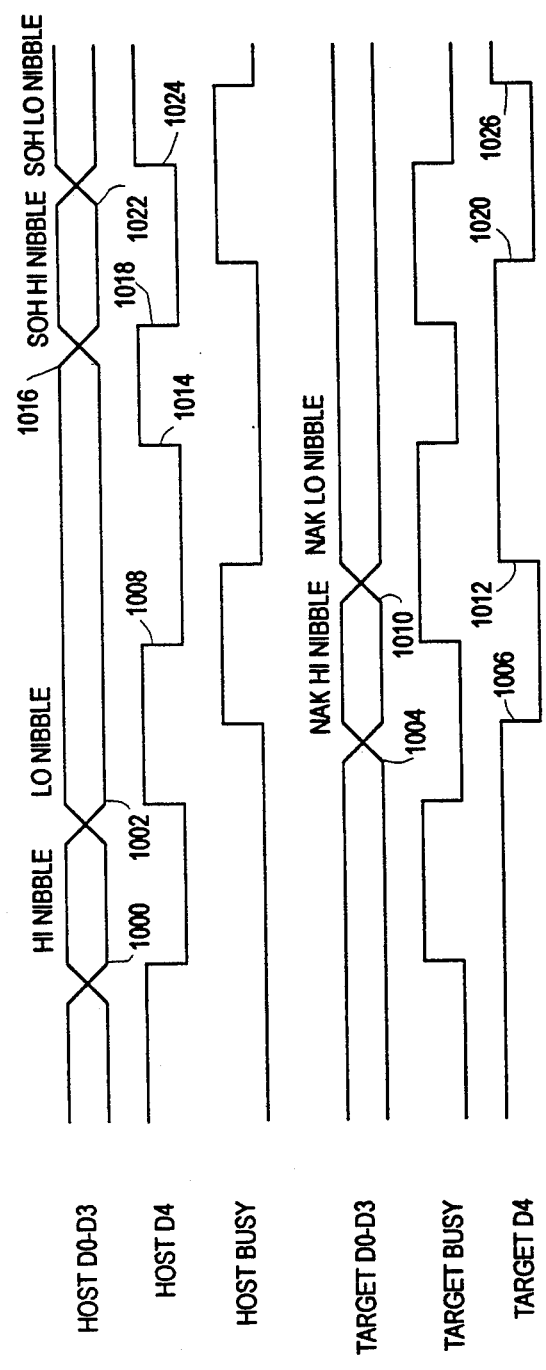

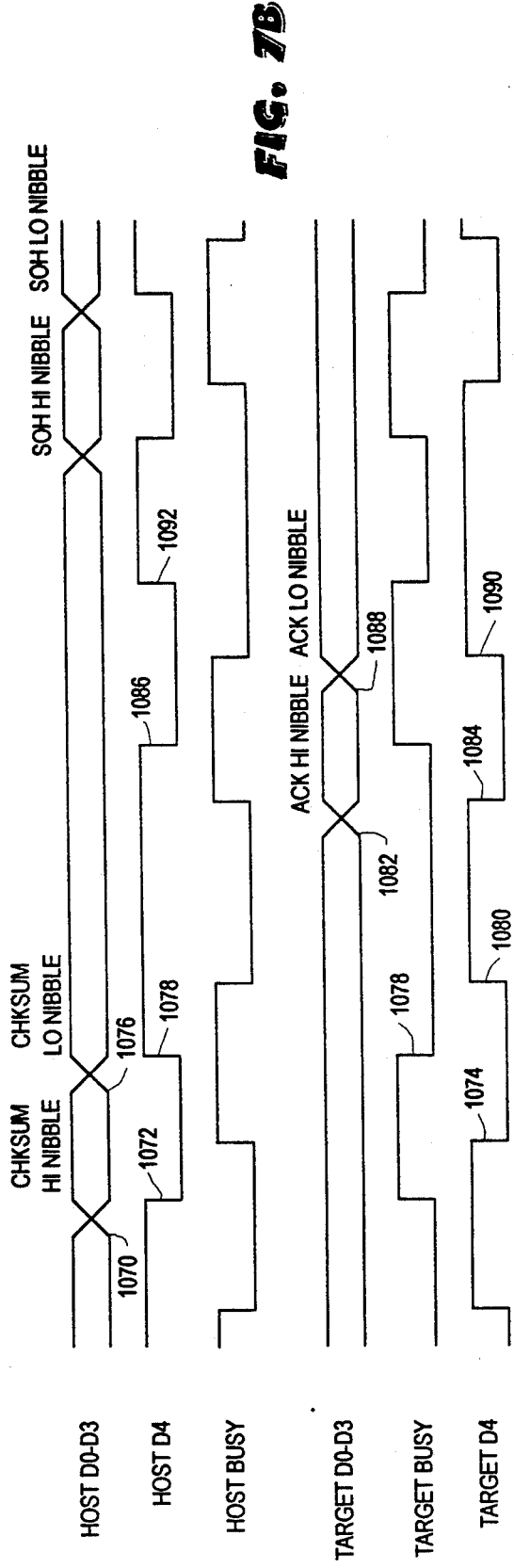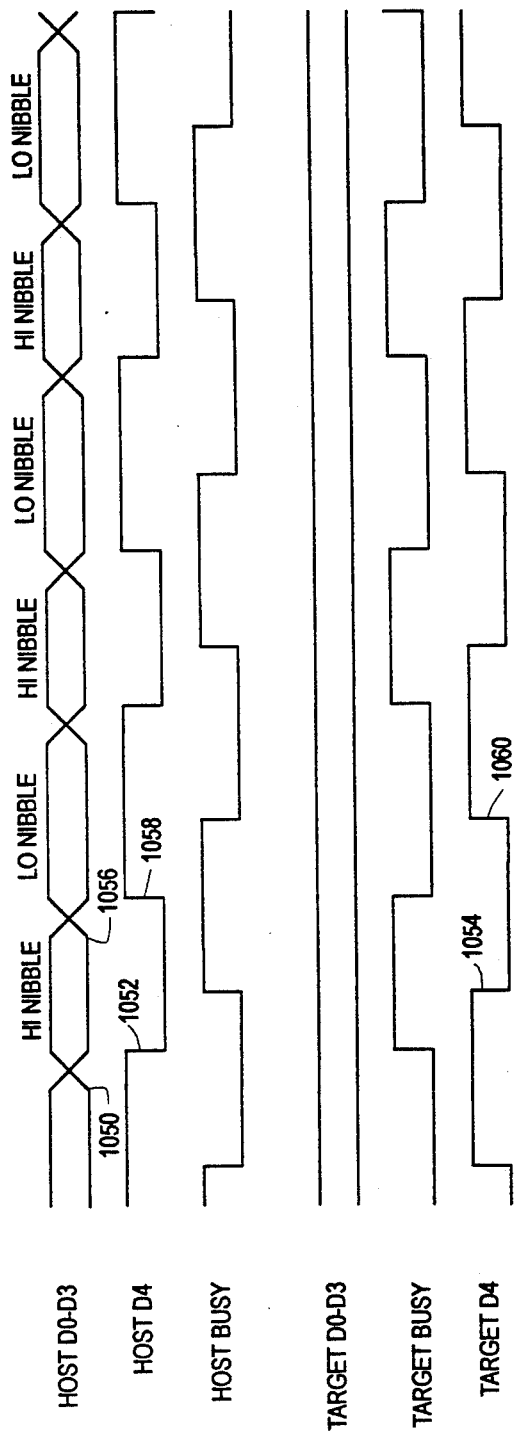

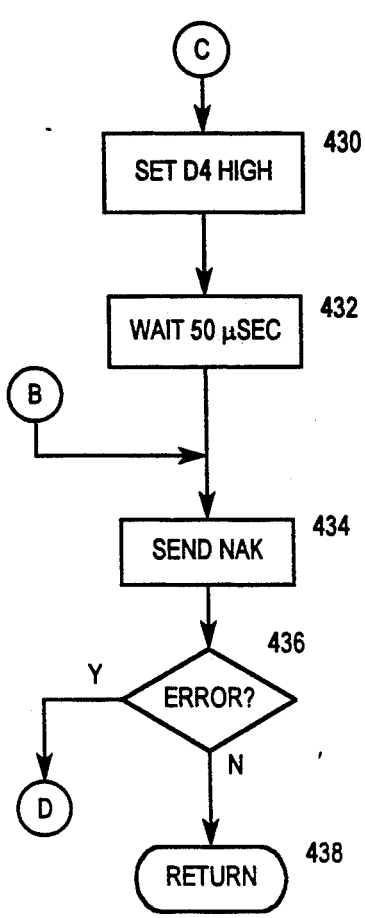
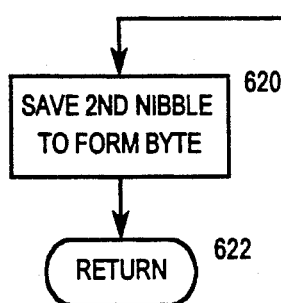
FIG. 8B
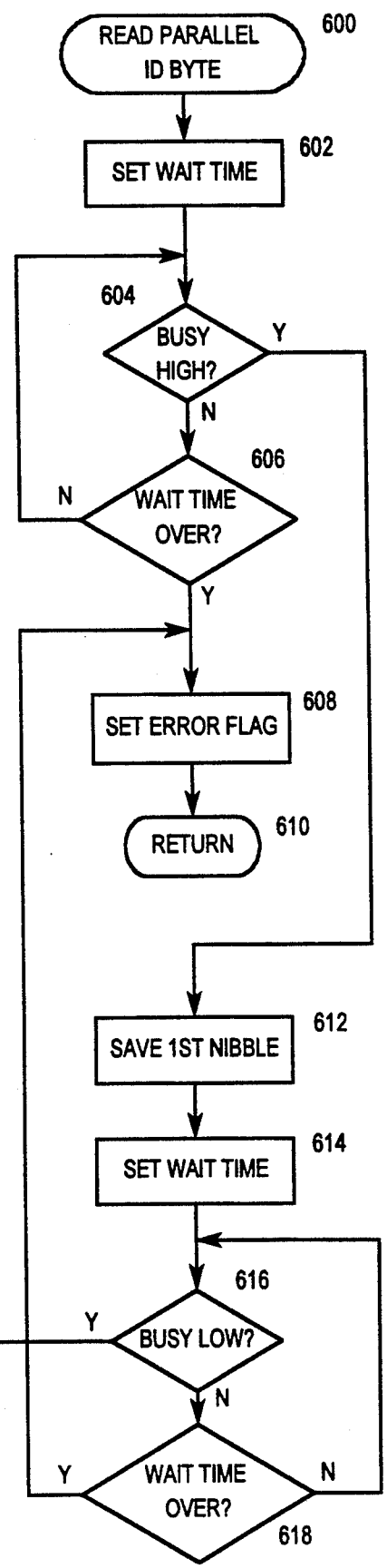
FIG. 9

EXTERNAL BOOT INFORMATION LOADING OF A PERSONAL COMPUTER

BACKGROUND OF THE INVENTION

1. Field of the Invention

The invention relates to personal computers, and more particularly to loading of the operating system of the personal computer by devices external to the computer.

2. Description of the Related Art

While personal computers are becoming quite reliable and their operating systems are becoming quite stable and powerful, errors still do occur and at times it is desireable to load other operating systems onto the personal computer. In addition, diskless computers, generally referred to as workstations, are becoming quite prevalent on local area networks for security reasons.

Conventionally the initialization sequence of loading of the operating system, commonly referred to as booting of a personal computer is as follows. The personal computer is turned on and goes through certain initializations, such as an initial random access memory (RAM) check, initializing the interrupt controllers, direct memory access (DMA) controllers and other devices, and clearing and initializing the video display units and various input/output (I/O) devices. After the memory has been fully tested and initialization completed, the system attempts to boot itself from one of the magnetic media, generally either a floppy disk or a hard disk. This is done because usually the operating system is quite variable and large and therefore it is not desireable that it be located in the relatively expensive and limited amount of read only memory (ROM) present on a computer system. By placing the operating system on floppy disk or hard disk it can be much larger and can be much more variable. Thus it can be frequently changed without the difficulty of opening up the computer and replacing integrated circuits. Conventionally, personal computers first tried to boot from the floppy drive. This procedure developed when floppy drives were all that were available in a system and has continued as a means for allowing a computer to be booted if there is a failure to the hard disk drive or if alternative code which does not utilize the operating system present on the hard disk is to be used. If no floppy boot was possible, then control proceeds to try and boot from the hard disk. If that does not occur, errors are indicated and the computer did not boot. The term booting developed because a limited number of program instructions are first loaded from a known location on the disk. The first instructions included instructions to allow further instructions to be loaded from the disk. Because the programs are initially small and get larger, the process was referred to as booting up in a reference to pulling oneself up by one's bootstraps.

However, as previously stated, errors can occur in this process such that neither the floppy nor the hard disk drives are available for booting, either due to equipment malfunction or their complete absence in the computer if it is a diskless work station. Therefore, for diagnostic purposes or network purposes it is desireable to have a personal computer which can be started and then booted up even if both the floppy and disk drives are inactive or not present. Then various diagnostic tests can be performed or the network operating system loaded and executed.

SUMMARY OF THE INVENTION

A computer system according to the present invention analyzes any serial and parallel inputs present in the computer system prior to attempting to boot from the floppy disk to see if incoming data may be present on those ports. If data of some type is present, further analysis is done on that particular port. If the data being received matches a given character sequence as predetermined by the ROM or basic operating system of the computer system, then this is considered an attempt or request to load the operating system in over the particular port. Once the attempt is acknowledged to the host system which is trying to do the downloading, certain boot code is loaded into the target machine and executed, the boot code containing further software which allows complete loading of the operating system or other diagnostic code as desired.

The target system does not actively drive either the serial or parallel ports during the period while a request is being analyzed but merely reads information being provided to the particular port. In this way should an alternate remote device be present it is not activated or otherwise initiated by data being presented to the serial or parallel port by the computer system. Thus a noninvasive technique is presented to allow booting from the serial or parallel port. The operation of this code to interrogate the ports prior to interrogating the floppy drive or hard drive for a boot sector allows booting of the computer system, preferentially by a diagnostic computer, even if the floppy or hard drives have failed or are not present. The system also allows easy operating system loading by a network connected over a serial or parallel port.

BRIEF DESCRIPTION OF THE DRAWINGS

A better understanding of the present invention can be obtained when the following detailed description of the preferred embodiment is considered in conjunction with the following drawings, in which:

FIGS. 2A and 2B are alternative serial and parallel download operating sequences for the host systems of FIGS. 1A and 1B;

FIGS. 6A and 6B are exemplary timing diagrams of the identification phase of the transmission between the computers of FIG. 1B in parallel mode;

FIGS. 7A and 7B are exemplary data transmission timing diagrams of computers according to FIG. 1B; and FIGS. 8A, 8B, 9, 10A, 10B, 10C, 11 and 12 are flowchart illustrations of the operating sequences of a target computer according to the present invention.

DETAILED DESCRIPTION OF THE PREFERRED EMBODIMENT

Figure 1A:
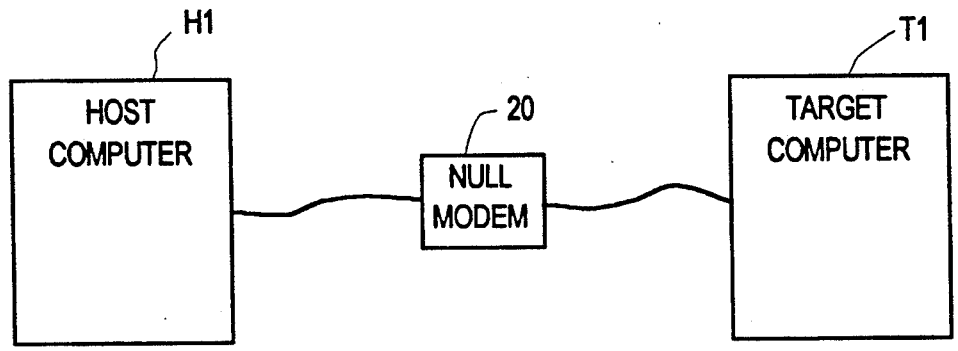
FIGS. 1A and 1B are alternative serial and parallel block diagrams of two computers connected for operation as according to the present invention.

Referring now to FIG. 1A, a host computer H1 and a target computer T1 are connected through a null modem 20 to allow communication between the computers H1 and T1. Both computers H1 and T1 have serial ports, preferably according to the RS-232 protocol, which can operate at various baud rates and are programmable by the particular computer H1 or T1. The two serial ports of the computers H1 and T1 are connected by the null modem 20 to allow direct connection between the two computers H1 and T1.

Figure 1B:
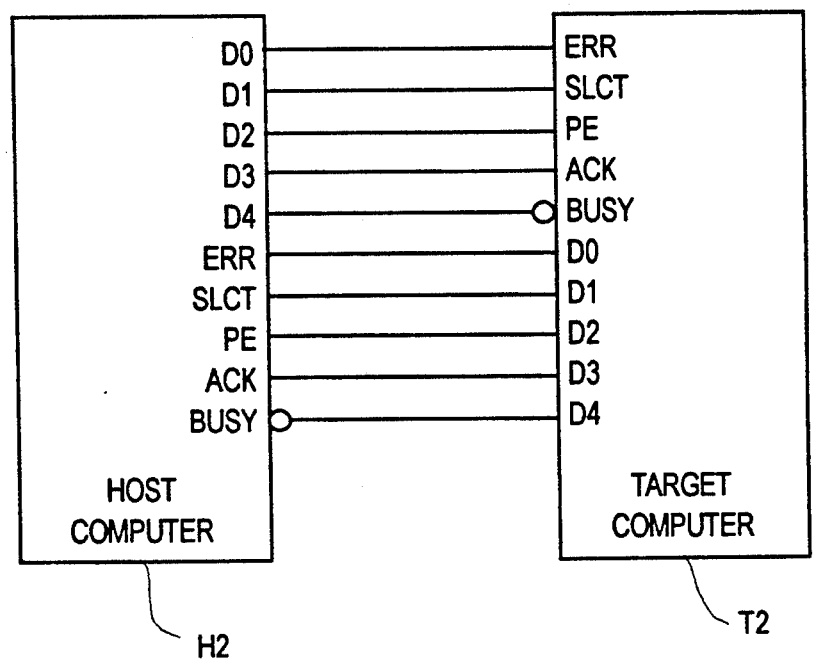

FIG. 1B shows an alternative connection of a host computer H2 and a target computer T2 by means of a parallel port. Each computer H2 and T2 has a parallel port generally conforming to the Centronics protocol, the most commonly used parallel port protocol in personal computers. To prevent possible driving of the various output lines of the computers H2 and T2, they are configured as shown in FIG. 1B. While the parallel ports in the computers H2 and T2 are both bi-directional ports, there may be some overlap interval in a handshake sequence when both ports may be driven as outputs. Therefore it is generally undesirable to directly connect the various data lines together, with the potential for harm to a particular port, but a full byte arrangement using the data lines could be used if desired. Therefore the preferred arrangement of the signals between the computers H2 and T2 is shown in FIG. 1B. Five output signals D0-D4 of the host computer H2 are connected to the various input signals commonly available in the parallel port of the target computer T2. The D0 signal is connected to the ERR or error input, while the D1 output of the host computer H2 is connected to the SLCT or select input. The D2 or third data bit is connected to the paper end or PE input of the target computer T2, while the output D3 is connected to the ACK or acknowledge input. The D4 output of the host computer H2 can be considered the strobe out signal and is connected to the BUSY input of the target computer T2. It is noted that the BUSY input is inverted by the target computer T2 so that the BUSY signal is the inverse of the D4 output. The BUSY signal can be considered the strobe in signal. In an alternate embodiment the STROBE output in the parallel port could be used in place of the D4 output. The use of the D4 output is described herein for exemplary purposes, but the alternate use of the STROBE output is understood. A similar arrangement is developed for the signals provided from the target computer T2 to the host computer H2. Thus in this manner there are no outputs that may potentially drive outputs of the other device and thus the possibility is removed. It is noted however that the parallel port embodiment of FIG. 1B is limited to exchanging data one nibble at a time, thus slightly complicating the sequence of transferring data, but this complication is preferred over the potential for damage to the parallel ports.

It is noted that the host computers H1 and H2 may actually be a single physical computer having both a parallel and a serial port, with the target computers T1 and T2 similarly being a single computer having both a serial and a parallel port. Because booting is generally preferred over only one link, two conceptually separate systems are described for convenience.

To perform the external boot or code download sequence both computers must contain operating software to perform the function. The software contained in the host computer H1 for the serial embodiment is illustrated in FIG. 2A. The serial sequence 100 for the host computer H1 begins at step 102 where various initialization events occur. Control proceeds to step 104 where the file which is to be downloaded to the target computer T1 is opened on the host computer H1. Control proceeds to step 106 where the serial port which is coupled to the target computer T1 is started. Control proceeds to step 108 where the next character in a predetermined identification string is transmitted over the serial port. The pointer or reference was set during the initialization step 102 to compensate for this initial increment. In the preferred embodiment the character string is the 6 letters COMPAQ because that is the name of the manufacturer of the preferred embodiment. Of course, it is understood that any other character string could be utilized to perform this function.

After a character is sent over the serial port in step 108, control proceeds to step 110 where a 30 millisecond delay is introduced. This delay is introduced to allow the target computer T1 time to process any data which it may be receiving and determine that communication is being attempted. Control proceeds to step 112 where the host computer H1 checks to see whether the NAK control code has been received from the target computer T1. This is an indication that the target computer T1 has recognized that a communication attempt is present and is an acknowledgement of that recognition. If the NAK code has not been received, control proceeds to step 108 and the loop continues. In this way the various letters or characters in the identification sequence are repetitively transmitted to allow the target computer T1 to synchronize and to establish that a valid communication attempt is being made.

If the NAK code has been received in step 112, indicating that the target computer T1 has recognized the host computer H1 is preparing for transmission, control proceeds to step 114 where the download file which had previously been opened in step 104 is transmitted to the target computer T1, preferably using the XMODEM protocol. After the file has been downloaded in step 114, control proceeds to step 116 where the EOT character code is transmitted to the target computer T1 to indicate that this is the end of the transmit sequence. Control then proceeds to step 118 where the host computer H1 continues other activities as desired, such as developing a communications interface between the two computers H1 and T1 for further transfer of information or interrogation of the states of various devices in the target computer T1.

If the computers H2 and T2 are connected as shown in FIG. 1B, then the parallel sequence 150 is utilized to perform the download operation. Operation of sequence 150 commences at step 152 where initialization operations occur. The download file is then opened in step 154 and the parallel port is started in step 156. Control is transferred to step 158, where the first nibble of the next character of the identification sequence is transmitted over the parallel port and a 15 millisecond delay is developed. After the 15 millisecond time is completed, control proceeds to step 160, where a second nibble of the character is transmitted and a further 15 millisecond delay occurs. Control proceeds to step 162 to see if the first nibble of an NAK code has been received from the target computer T2. If not, control returns to step 158 and the transmission of the character sequence continues. If a NAK code nibble has been received, after a delay period in 164 control proceeds to step 166 to determine if the second nibble of the NAK code has been received. If not, control returns to step 158 to complete the loop while if so, control proceeds to step 168, where the download file is transmitted nibble by nibble according to the XMODEM protocol and the EOT code is transmitted in nibble mode after the entire file has been downloaded. This file transfer and the timing of events is explained in more detail later. Control proceeds to step 170 where operation of the host computer H2 continues. The operations of the various signals that occur in these sequences and the various protocols will be explained in more detail during the description of the operation of the target computers T1 and T2.

The target computers T1 and T2 are basically identical except for their connection as shown in FIGS. 1A and 1B, and indeed are preferred to be a single system. Their operation commences as follows. When the computers T1 and T2 are turned on, the reset sequence 200 is initiated. Control proceeds to step 202 where the self-testing of a keyboard interface device known as an 8042 microprocessor or peripheral interface is commenced. Control proceeds to step 204 where various initialization and masking of interrupts occurs. Control proceeds to step 206 where the CMOS memory contained in the target computer T1 or T2 is checked. Control proceeds to step 208 where the timers contained in the computer system T1 or T2 are initialized. Control proceeds to step 210 where the floppy drive unit and display adapters are turned off. Control proceeds to step 212 where the display adapters are initialized and cleared. Control proceeds to step 214 where the first 128 kbytes of random access memory (RAM) are tested. Control proceeds to step 216 where the stack pointer and necessary other variables are initialized. Control proceeds to step 218 where the video graphics adaptor or external video board is initialized. Control proceeds to step 220 where any characters received from the keyboard of the computer are flushed. Control proceeds to step 222 where a read only memory (ROM) checksum test is performed to determine the integrity of the ROM. Control then proceeds to step 224 where a test of the CMOS memory is performed to make sure it is properly functioning. Control proceeds to step 226 where the various partitions of the memory, such as base, extended or expanded, as familiar to those in the personal computer industry, are set. Control proceeds to step 228 where the direct memory access controller is tested and initialized. Also in step 228 the 8042 keyboard controller is tested.

Figure 3A:
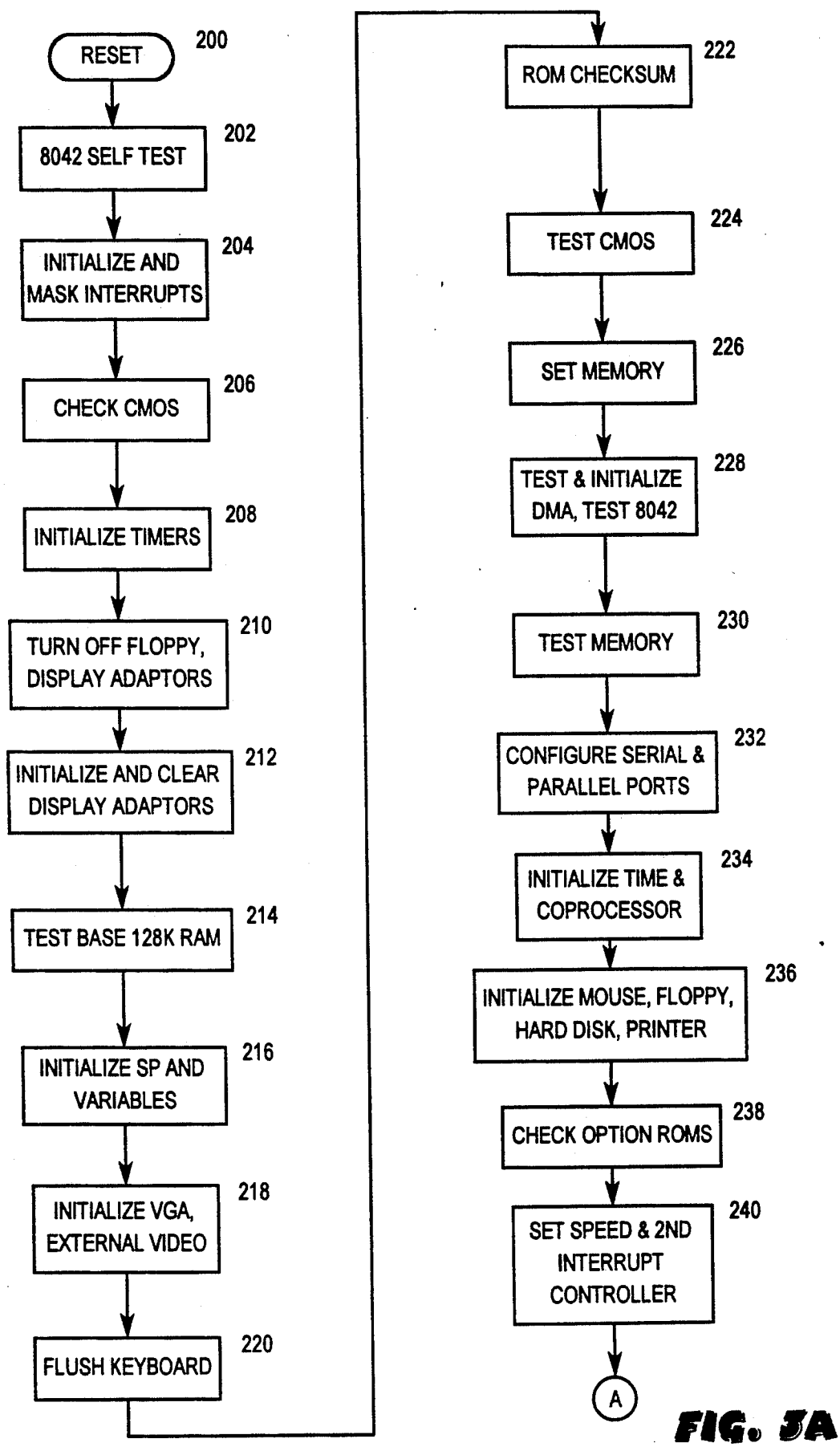
FIGS. 3A and 3B are flowchart sequences of the power-on self-test sequence of a target computer according to the present invention.
Figure 3B:
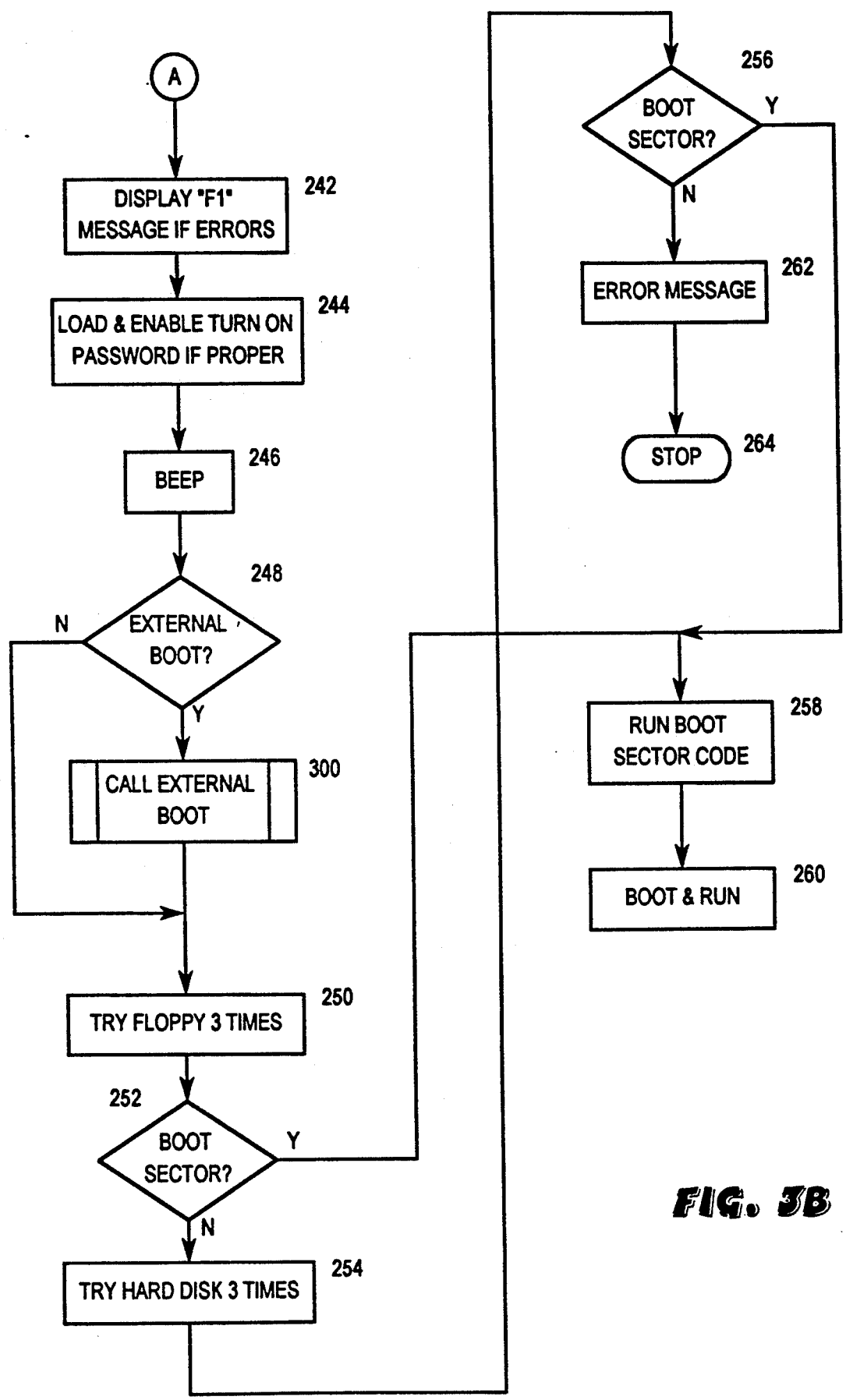

Control proceeds to step 230, where the memory that has been set is now tested. Control next proceeds to step 232 where the serial and parallel ports present in the computer T1 or T2 are configured. Operation proceeds to step 234 where the time of day is initialized from values contained in the CMOS memory/real time clock unit and any numerical processor that is present is initialized. Control then proceeds to step 236, where any mouse or auxiliary device, the floppy drive, the hard disk unit and the printer port are initialized. Control proceeds to step 238 where the presence and accuracy of any option ROM's located in the system are determined. Control next proceeds to step 240 where the operating speed of the computer is set and a second additional interrupt controller is initialized. Control then proceeds to step 242 (FIG. 3B) where an error message indicating entry of the F1 key is displayed if any errors have occurred in the various tests that have previously been performed. After the F1 key is depressed, if necessary, control proceeds to step 242 where the keyboard password value is loaded into the keyboard controller and enabled, if such an option is selected. Control proceeds to step 246 where a beep is issued by the computer to indicate to the user that the power-on self-test or POST sequence is completing. Control then proceeds to step 248 which a determination made if external booting is to occur. If so, control proceeds to the external boot sequence 300. If an external boot is not to be performed, control proceeds from step 248 to step 250, where three attempts are made to read the boot sector on the floppy disk drive. If in step 252 it is determined that a boot sector has not been obtained, control proceeds to step 254 to try and read a boot sector from a hard disk unit three times. Control then proceeds to step 256 to determine if a boot sector was successfully obtained from the hard disk unit. If so, or if a boot sector was first obtained from the floppy disk as determined in step 252, control proceeds to step 258 where the computer T1 or T2 executes this boot sector code. Control proceeds to step 260 where the computer proceeds to boot and begins its normal operations.

If a boot sector was not obtained in step 256, control proceeds to step 262 where an error message is provided indicating that a boot sector could not be obtained and control proceeds to step 264 where the target computer T1 or T2 essentially stops.

This is a general overview of a power-on self-test sequence of a personal computer according to the preferred embodiment and of course is understood that other sequences could be utilized with the various steps rearranged but preferably having the external boot determination prior to floppy disk or hard disk boot operations. It is noted that the external boot operation could be moved to after a boot from the hard disk failure for terms of diagnostic use, but it is preferred that this step be earlier in sequence because the failure of the two floppy and hard disk systems will be previously known prior to an attempt to externally boot. This is also the preferred location to prevent overriding of certain boot sequences if connected to a network or other device. Further, the use in this manner allows ready use of the same sequencing in a diskless workstation, thus reducing cost.

Figure 4:
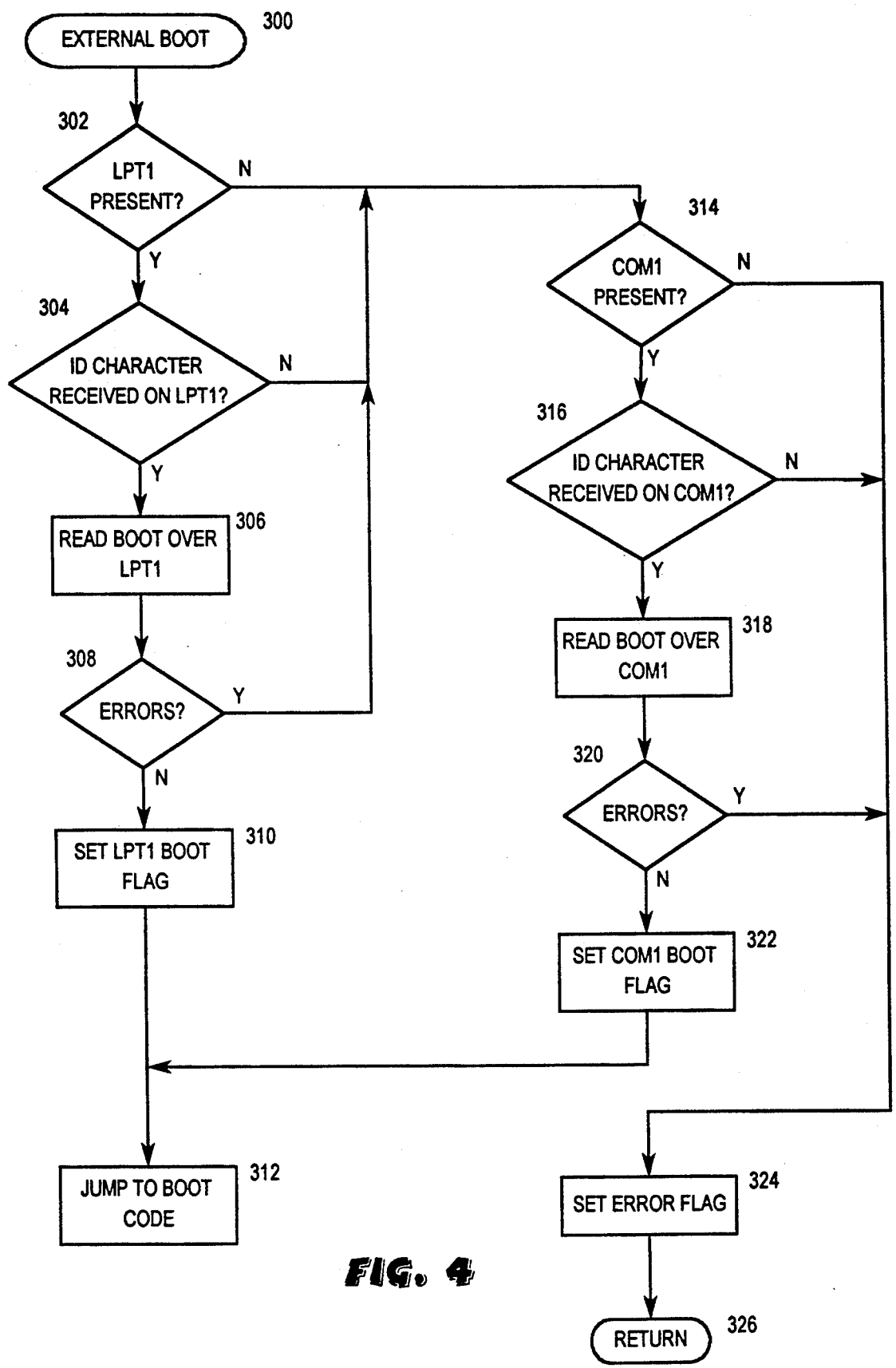
FIGS. 4 and 5 are flowcharts illustrating operating sequences of a target system according to the present invention.
Figure 8A:
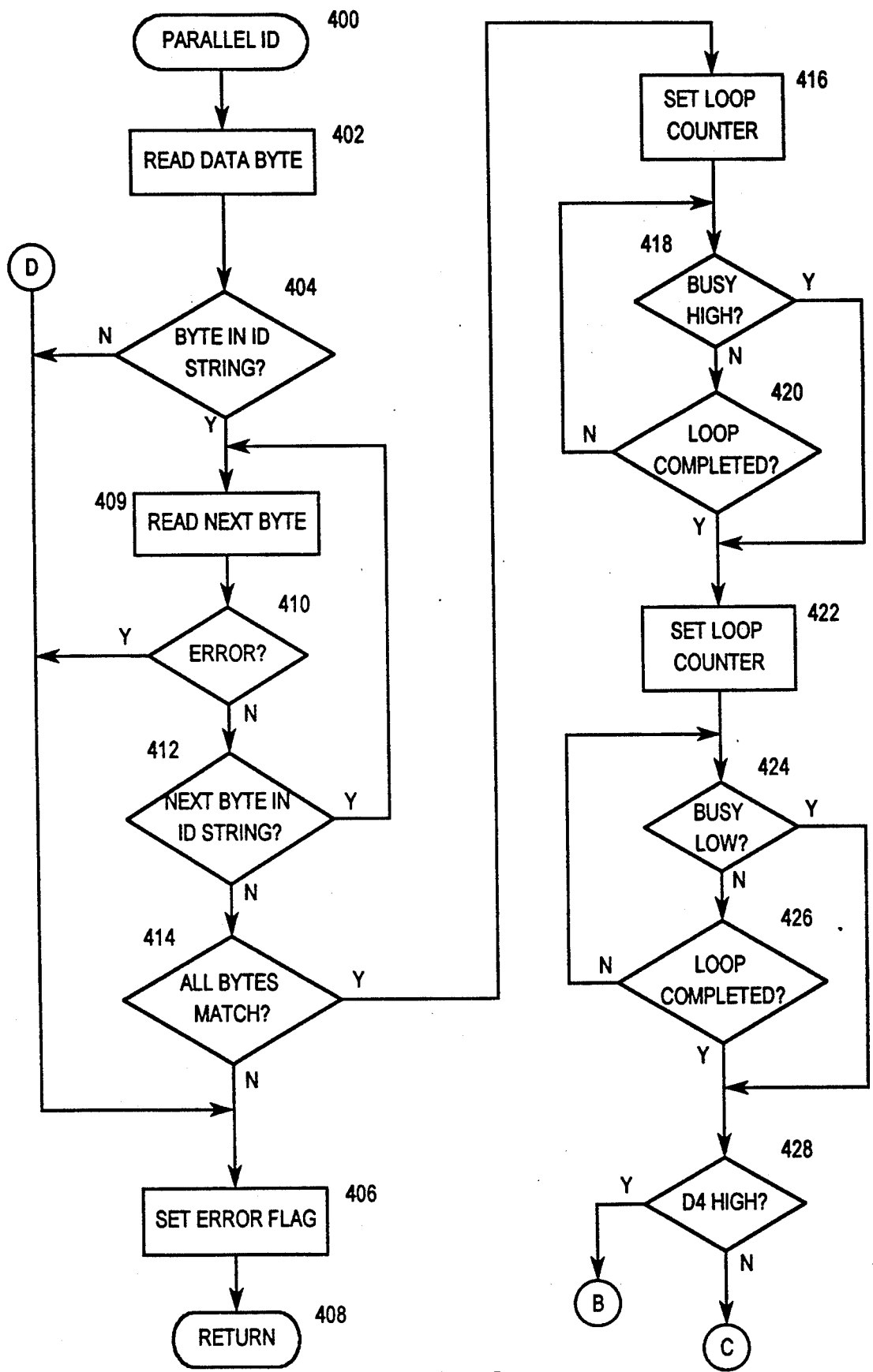
Figure 10A:
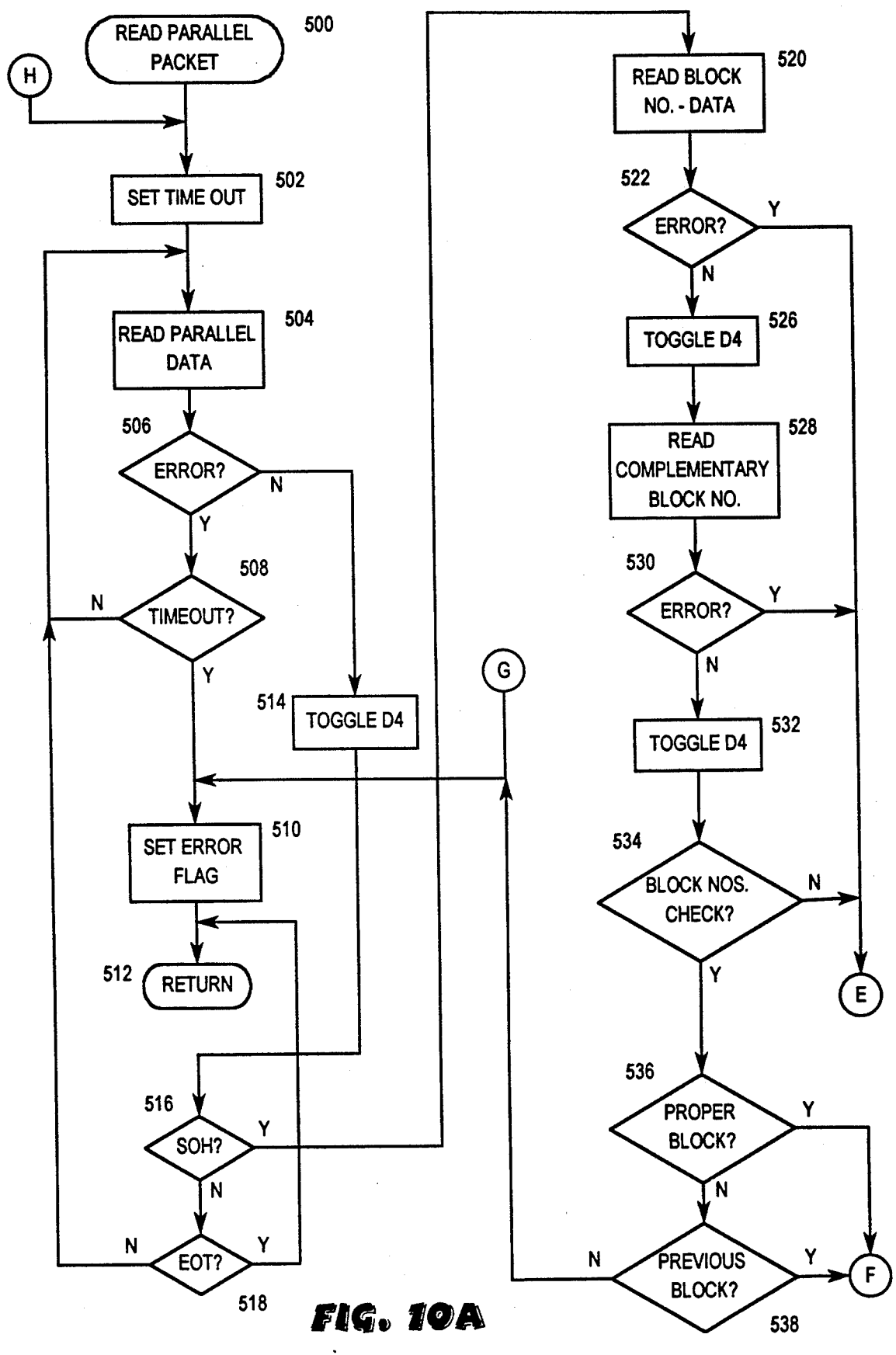

As noted previously, in step 248 a determination is made as to whether an external boot is to be performed. If so, the external boot sequence 300 (FIG. 4) is executed. The sequence 300 commences by determining in step 302 if a parallel port, preferably one generally referred to as LPT1 or Line Printer 1, is present in the computer T1 or T2. If so, control proceeds to step 304 to determine if an identification character string has been received on the parallel port. This operation is performed by the parallel ID sequence 400 (FIG. 8A). If the identification character string has been received, control proceeds to step 306 where the boot information is read over the parallel port. The sequence for performing this operation is detailed in the read parallel packet sequence 500 (FIG. 10A). After the boot information has been received in step 306, control proceeds to step 308 to see if an error was obtained during the reading of the boot information. If not, control proceeds to step 310 where a flag is set to indicate that the computer system T1 or T2 was booted over the parallel port. Control then proceeds to step 312 where a jump instruction is performed to the beginning of the boot code or information so that the boot strap loader is executed. This boot strap loader can include further code which allows transmission of a larger portion of the operating system or can contain diagnostic code necessary to evaluate conditions in the target computer T1 or T2.

Figure 5:
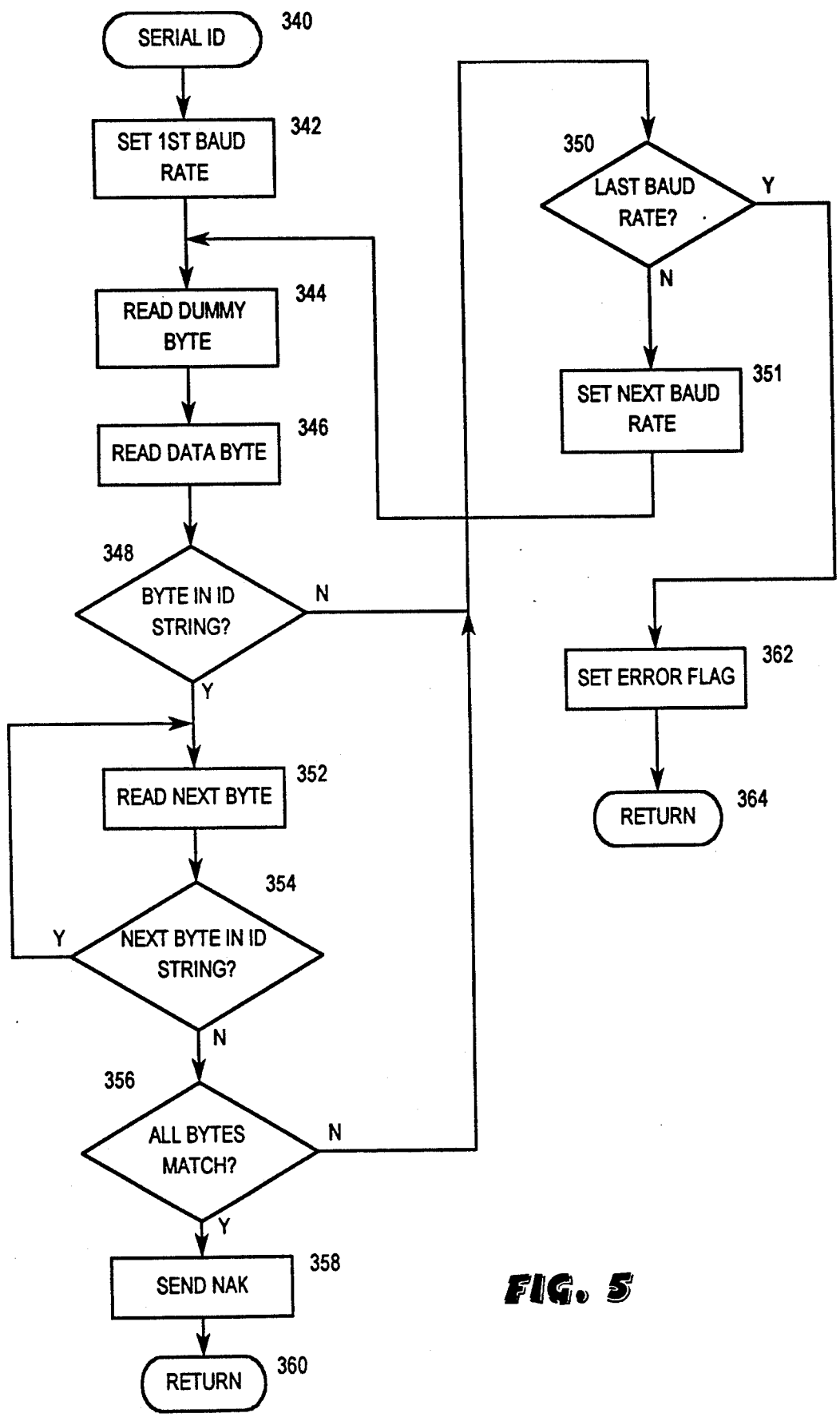

If the line printer or parallel port was not present in step 302, the identification string was not received in step 304 or errors occurred in step 308, control proceeds to step 314 where a determination is made as to whether a serial port, preferably one generally referred to as COM1, is present. If so, control proceeds to step 316 where a serial identification sequence 340 (FIG. 5) is performed to determine if the identification character string is being received on the serial port. If so, control proceeds to step 318 where the boot information is read over the serial port, preferably using the XMODEM protocol which will be generally explained in the parallel data transfer case. Control then proceeds to step 320 to determine if errors were obtained in this boot information transfer. If not, control proceeds to step 322 where the boot flag is set to indicate that the source was the serial port and control then proceeds to step 312 to execute the boot code. If a serial port was not present in step 314, an identification character string was not received in step 316 or errors were developed in step 320, control proceeds to step 324 where an error flag is set to indicate that external booting will not be occurring and control returns in step 326 to the power-on self-test code step 250 to try and boot from the floppy drive.

If the computers H1 and T1 are configured in the serial transfer mode of FIG. 1A, serial identification character string determination is performed in sequence 340. Sequence 340 commences at step 342 where a default first baud rate is set for the serial port. Control then proceeds to step 344 to read a dummy byte because it has been determined that an initial read after setting of the baud rate may produce erroneous information. Control then proceeds to step 346 to read a valid data byte, if one is present. Control proceeds to step 348 where a determination is made as to whether the data byte just read from the serial port is contained in the identification character string. If not, control proceeds to step 350. If it is present, control proceeds to step 352, where the next byte is read from the serial port. After this byte is read in step 352, in step 354 the target computer T1 evaluates this byte to see if it is the next byte in the identification character string. If so, control returns to step 352 where further characters in the string are obtained. If it is not the next byte, control proceeds from step 354 to step 356 where a determination is made if all of the bytes in the identification character string have been obtained and there is a match. If so, control proceeds to step 358 where the target computer T1 sends an NAK character code back to the host computer H1 to indicate that it has received and acknowledged the ID character string. Control then exits the serial identification sequence 340 in step 360 so that the boot information can be obtained.

In step 350, which is where control proceeds if the bytes do not match in step 358 or if the byte is not in the identification character string in step 348, a determination is made as to whether the last baud rate available for the serial port has been tried. If not, control proceeds to step 351 where the next baud rate is tried. Control then proceeds to step 344 and the process is repeated. If however the last baud rate was tried as determined in step 350, control proceeds to step 362 which sets an error flag and control returns to the calling sequence, with the error flag set to indicate that an identification string was not received over the serial port. Control proceeds to step 364 where control returns with an error indication.

It is noted that if a data byte is not obtained in steps 344 or 346 within a given time interval control proceeds to the next step with no valid data. This continuing of operation is provided so that an infinite wait condition is not developed should the serial port not be active.

Thus the target computer T1 can readily determine if an identification character string is being provided to indicate an external boot attempt. The operation of this serial link is relatively uncomplicated as compared to the parallel string operation because of the additional hardware present in the serial port which allows full byte width characters to be transmitted using a conventional or readily known sequence.

It is noted that during this serial identification sequence data was not transmitted from the target computer T1 to the host computer H1 until after the entire identification character string had been evaluated and determined to be present. This prevents accidental or incidental activation of a particular device other than the host computer H1 which might be present on the serial port.

While in the preferred embodiment a six character string comprising the letters COMPAQ is the preferred identification character sequence, in the timing diagrams of FIGS. 6A and 6B a shortened format of only a single character is used for clarity purposes. The general operation in the parallel port transfer sequence is such that the host computer H2 transfers information on the edges of its D4 output, with the high nibble being transferred on the falling edge of the D4 output and the low nibble being transferred on the rising edge of the D4 output, as viewed from the host computer H2. This sequence continues during the identification process with the target computer T2 not changing the state of its D4 output because of the desire not to drive any signals during the identification process. After the identification process is completed and the data communication between the two devices is commencing, the host computer H2 still transfers the high nibble of data on the falling edge of its D4 signal but does not transmit the low nibble until it has received a low to high transmission of its BUSY input signal. The low nibble is then placed on the data lines and the D4 output raised to indicate the presence of this low nibble. The target computer T2 detects this transition, reads the nibble of data and toggles the state of its D4 output, which to the host computer H2 indicates that the BUSY signal has gone low, thus indicating that the target computer T2 has accepted the second nibble and it is safe to proceed with the transmission of the high nibble of the next data byte. This is the general communications technique and can be seen readily in FIGS. 6A, 6B, 7A and 7B.

In the timing diagrams of FIGS. 6A, 6B, 7A and 7B it is noted that the host D4 and target BUSY signals are inverses and the host BUSY and target D4 signals are inverses, while the host D0–D3 and target D0–D3 signals are independent. It is noted that there are two potential identification synchronization options based on the initial state of the D4 output in the target computer T2. These are shown in FIGS. 6A and 6B respectively.

Referring first to FIG. 6A, this is the condition where the target D4 output is in a high state during the identification operation. By time 1000 the host computer H2 has presented the high nibble of a character in the identification string on to its D0–D3 lines and the values are stable. Thus at time 1000 the host computer H2 can lower the D4 output to indicate that a high nibble is present. The host computer H2 proceeds to wait 15 milliseconds and then presents the low nibble onto the data lines prior to time 1002. At time 1002 the host computer H2 raises the D4 output to indicate that a low nibble is present. In the example this is the last character in the string for identification purposes and thus at this time the target computer T2 will have determined that a communication attempt to externally boot the target computer T2 is present and will then at time 1004 begin presenting data onto its D0-D3 data lines which represents the high nibble of the NAK character code. At time 1006 the target computer T2 changes the output state of its D4 output from high to low to indicate to the host computer H2 that a signal is being acknowledged and that a valid NAK signal is present. The host computer H2 responds by lowering its D4 output to indicate that it has accepted the nibble at time 1008. After the target computer T2 receives this lowering of the host D4 signal by determining that the target BUSY signal has been raised, the target computer T2 presents the low nibble of the NAK character code onto its data lines at time 1010. At time 1012 the target computer T2 raises its D4 output to indicate to the host computer H2 that the low nibble is present. The host computer H2 acknowledges this by raising its D4 output at time 1014, thus completing the transmission of this signal and indicating that the host computer H2 will begin transmitting a packet of data now that a full handshake has been completed between the two computers H2 and T2.

In the preferred embodiment the XMODEM protocol is used for the data packet transfer and therefore at time 1016 the host computer H2 places the high nibble of the start of header or SOH character code onto its data lines and at time 1018 lowers its D4 output. The target computer T2 senses this raising of its BUSY signal and at time 1020 lowers its D4 output to indicate acknowledgement of receipt of the high nibble. At time 1022 the host computer H2 changes the data present on its data lines to the low nibble of the SOH character code and at time 1024 raises its D4 output. The target computer T2 senses this lowering of its busy input and shortly thereafter at time 1026 raises its D4 output to indicate the completion of the handshake for this particular nibble. The sequence continues as will be shown. Thus it can be seen that until the final character of the identification sequence is obtained the target computer T2 does not toggle its output line D4 but merely uses the edges that are present on its BUSY signal to load in nibbles of data until a full character string is obtained.

FIG. 6B is similar except that the target D4 output starts out in a low state, thus requiring it to go to a high state prior to its driving of the high nibble of the NAK character code. This change of state occurs by having the D4 output go high after the target computer T2 recognizes that the entire character code sequence has been received. At that time it knows it is in contact with the host computer H2 and thus a device will not be erroneously driven should the D4 output level be changed. The host computer H2 understands that a low-to-high transition has occurred without a recent high-to-low transition and so ignores the transition, waiting only for the high-to-low transition. Shortly after the target computer T2 raises its D4 output operation commences similarly to that of FIG. 6A.

Exemplary data transmission is shown in FIG. 7A. This is a sample of a portion of the main block of 128 bytes being transferred in an XMODEM packet. At exemplary time 1050 the host computer H2 provides the high nibble of data onto its data lines and at time 1052 lowers its D4 output. At this time the host BUSY signal will be low indicating that the target D4 output is high. Shortly thereafter the target D4 output goes low at time 1054 to indicate that the target computer T2 has acknowledged the high nibble. At time 1056 the host computer H2 then provides the low nibble of the particular byte onto the data lines and then at time 1058 raises its D4 output to indicate that the low nibble is present on the data lines. The target computer T2 senses this by seeing its BUSY signal go low and acknowledges by raising its D4 output at time 1060. This sequence continues as can be seen in FIG. 7A until all of the data is transmitted.

The final item to be transmitted in an XMODEM packet is the checksum and this can be seen FIG. 7B. The checksum high nibble is provided onto the host data lines at time 1070 and the host D4 output lowered at time 1072. The target computer T2 will have been counting the bytes received and know this is the checksum and in the acknowledgement of the high nibble indication will lower its D4 output at time 1074. At time 1076 the host computer H2 will provide the low nibble data onto its data lines and at time 1078 raise its D4 output. The target computer T2 will sense this lowering of its BUSY signal at time 1078 and will at time 1080 raise its D4 signal to indicate acknowledgement. At this point in time the target computer T2 will know that it must transmit data to either acknowledge or not acknowledge the transmission of the packet and so in the shown embodiment at time 1082 drives the high nibble of the ACK or acknowledgement character code onto its data lines. At time 1084 the target computer T2 lowers its D4 output not in response to a change of the host D4 output to indicate to the host computer H2 that a high nibble of data is present. The host computer H2 acknowledges that signal change at time 1086 by lowering its D4 output. After this lowering has been sensed by the target computer T2, the low nibble of the ACK character code is presented onto the target data lines at time 1088 and at time 1090 the target D4 output is raised. The host computer H2 acknowledges the receipt of the lowering of the BUSY signal and the presence of the ACK character code low nibble at time 1092 by raising its D4 output. Thus, the packet has been fully acknowledged and it is time to send either a header for the next packet or an EOT character code if this is the end of the transmission. The sequence continues as shown in FIG. 7B.

The synchronization is performed as shown in FIG. 6A and 6B and data transmission continues as shown in FIG. 7A and 7B. The operating sequences performed in the target computer T2 to provide these operations are shown in the following figures.

Referring now to FIG. 8A, the parallel identification sequence 400 is illustrated. The sequence begins with step 402 where a data byte is read using the read parallel identification byte sequence 600 (FIG. 9). Control proceeds to step 402 to determine if the read data byte is present in the identification character string. If not, control proceeds from step 404 to step 406 where an error flag is set and control then proceeds to step 408, which returns operation to the calling sequence to indicate that communication is not being properly attempted over the parallel port.

If the receive data byte was present in the identification character stream in step 404, control proceeds to step 409 to read the next byte. If there was an error in reading this byte as determined in step 410, control proceeds to step 406 where the error flag is set. If no errors occurred in step 410, control proceeds to step 412 to determine if this byte was the next byte in the identification string. If so, control returns to step 409 to continue reading the string. If not, control proceeds to step 414 to determine if all of the bytes in the character string have been obtained. If not, control proceeds to step 406 where the error flag is set and control returns indicating that parallel port-based external booting will not be occurring.

If all of the bytes were matched in step 414, this was a determination that the host computer H2 was trying to boot the target computer T2 over the parallel port. Control proceeds to step 416 where a loop counter value is set. This loop counter is utilized as a timeout should there be a communication sequence breakdown. Control proceeds to step 418 to determine when the BUSY signal of the target computer T2 goes high. If it is not high, control proceeds to step 420. In step 420 a determination is made as to whether the loop counter is sufficiently decremented so that the timeout loop is completed. If not, control returns to step 418.

Figure 11:
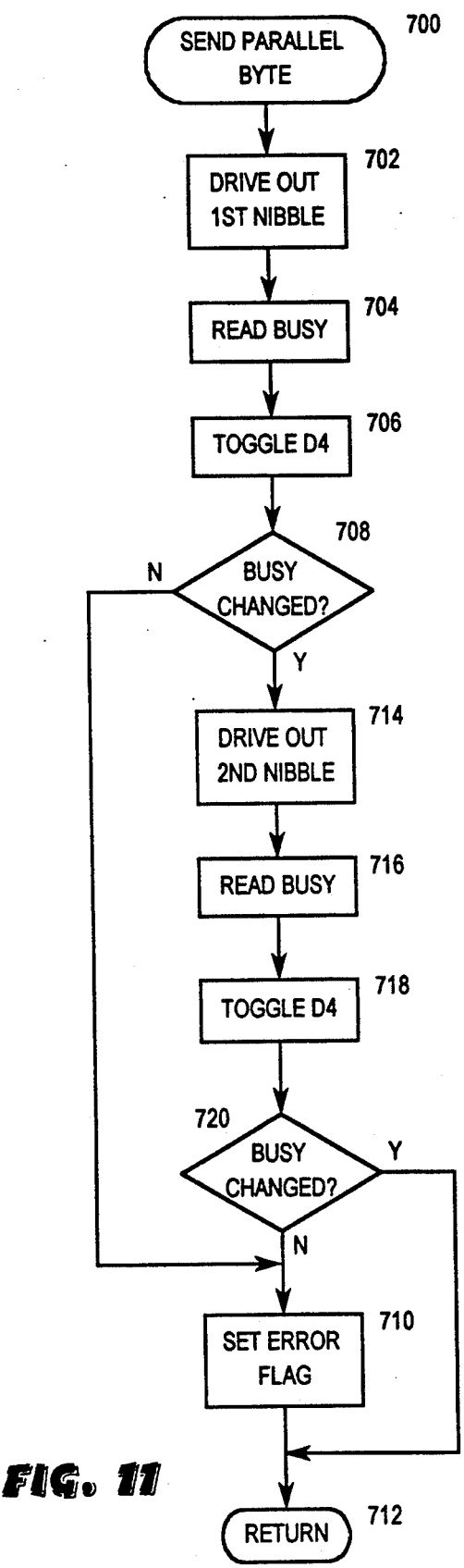

If the busy signal is high or the loop is completed, control proceeds to step 422 where the loop counter is again set. Control proceeds to step 424 to determine if the busy signal of the target computer T2 has gone low. If not, control proceeds to step 426 to determine if the loop is completed. If not, control returns to step 424. If the loop is completed in step 426 or the busy character is low, control proceeds to step 428 to determine the state of the D4 output of the target computer T2. Thus the target computer T2 has monitored an additional character transmission by the host computer H2 for additional synchronization purposes. If the D4 output is not high, control proceeds to step 430 (FIG. 8B) where the D4 output is set to a high state. Control then proceeds to step 432 where a 50 microsecond wait is developed to allow the D4 output to settle. Control then proceeds to step 434 which is also where control would proceed if the D4 output was high in step 428. In step 434 the NAK character code is transmitted using a send parallel byte sequence 700 (FIG. 11). Control proceeds to step 436 to determine if an error occurred during the transmission sequence. If not, control proceeds in step 438 to the calling sequence which allows the data packet to be read. If an error did occur, control proceeds to step 406 where an error flag is set.

Thus, the parallel identification determination sequence 400 reads the data present on the host output lines until a determination of a match is made. If a match is not made in a sufficient period or an erroneous value is obtained, an error flag is set, while if the match is made, the receipt of the signal is acknowledged so that transmission of the packet of the boot information can commence.

The read parallel identification byte sequence 600 commences at 602, where a wait time interval is established. Control proceeds to step 604 to determine if the target computer T2 BUSY input is high. If not, control proceeds to step 606. If the wait time is not over as determined in step 606, control proceeds to step 604. If the wait time is completed, this is an error condition and control transfers to step 608 where an error flag is set and to step 610 which returns operation to the parallel identification sequence 400.

If it was determined in step 604 that the busy signal was high, control proceeds to step 612 where the first nibble of data received from the data lines of the host computer H2 is saved. A wait time interval is then set in step 614 and control proceeds to step 616 to determine if the BUSY signal is low. If not, control proceeds to step 618 to determine if the wait time interval has been completed. If not, control returns to step 616. If the wait time is over, control proceeds from step 618 to step 608 where an error flag is set. If the busy signal is low as determined at step 616, control transfers from step 616 to step 620 where the second nibble is saved to form a byte of data. Control then proceeds to step 622 which returns operation to the parallel identification sequence 400.

Thus, the read parallel identification byte sequence 600 looks to the edges of the BUSY signal to determine the nibbles present on the parallel data lines and times out if edges do not appear in given intervals. It is noted that the target computer T2 D4 output is not altered during the identification sequence until a match has been made.

Figure 12:
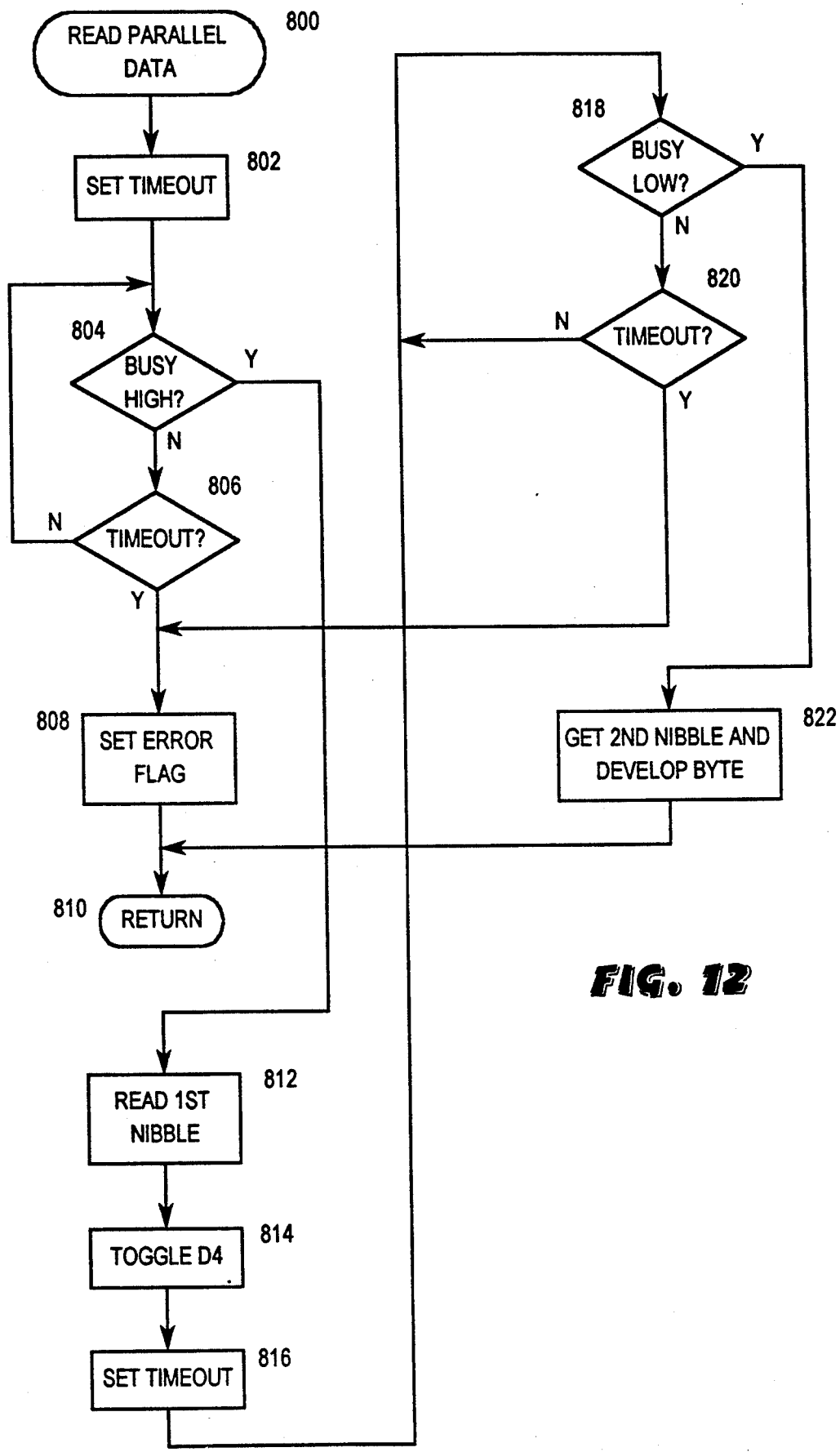

After the identification sequence has been determined and acknowledged, packets of data are then read by the read parallel packet sequence 500. Operation of the read parallel packet sequence 500 commences in step 502 where a timeout value is set. Control proceeds to step 504 where a byte of parallel data is read utilizing the read parallel data sequence 800 (FIG. 12). Control proceeds to step 506 to determine if an error occurred while reading the data. If so, control proceeds to step 508 to determine if the timeout has occurred. If no timeout has occurred, control returns to step 504 where another attempt is made to read a byte of data. If the timeout has occurred, control proceeds from step 508 to step 510 where an error flag is set and to step 512 which returns operation to the holding sequence with an indication that a packet has not been successfully received.

If an error was not received in step 506, control proceeds to step 514 where the D4 output is toggled to indicate to the host computer H2 that the particular byte has been acknowledged, the first nibble being acknowledged in the read parallel data sequence 800. Control then proceeds to step 516 to determine if the received byte is the start of header or SOH character code. If not, control proceeds to step 518 to determine if the received byte is the EOT character code. If not, control proceeds from step 518 to step 504 where further data is read in an attempt to synchronize to the beginning of the packet or end of the transmission. If the end of transmission character code has been received in step 518, control proceeds to step 512 to indicate that the packet has been completed.

If in step 516 the start of header character code was received, control proceeds to step 520 where the read parallel data sequence 800 is used to read the block number of the particular XMODEM packet being transmitted. Control proceeds to step 522 to determine to if an error occurred in the reading of the particular data byte. If so, control proceeds to step 524 where the byte counter for the bytes remaining in the packet is set to 128 plus 2 or 130 bytes. Operation after step 524 will be explained later.

Figure 10B:
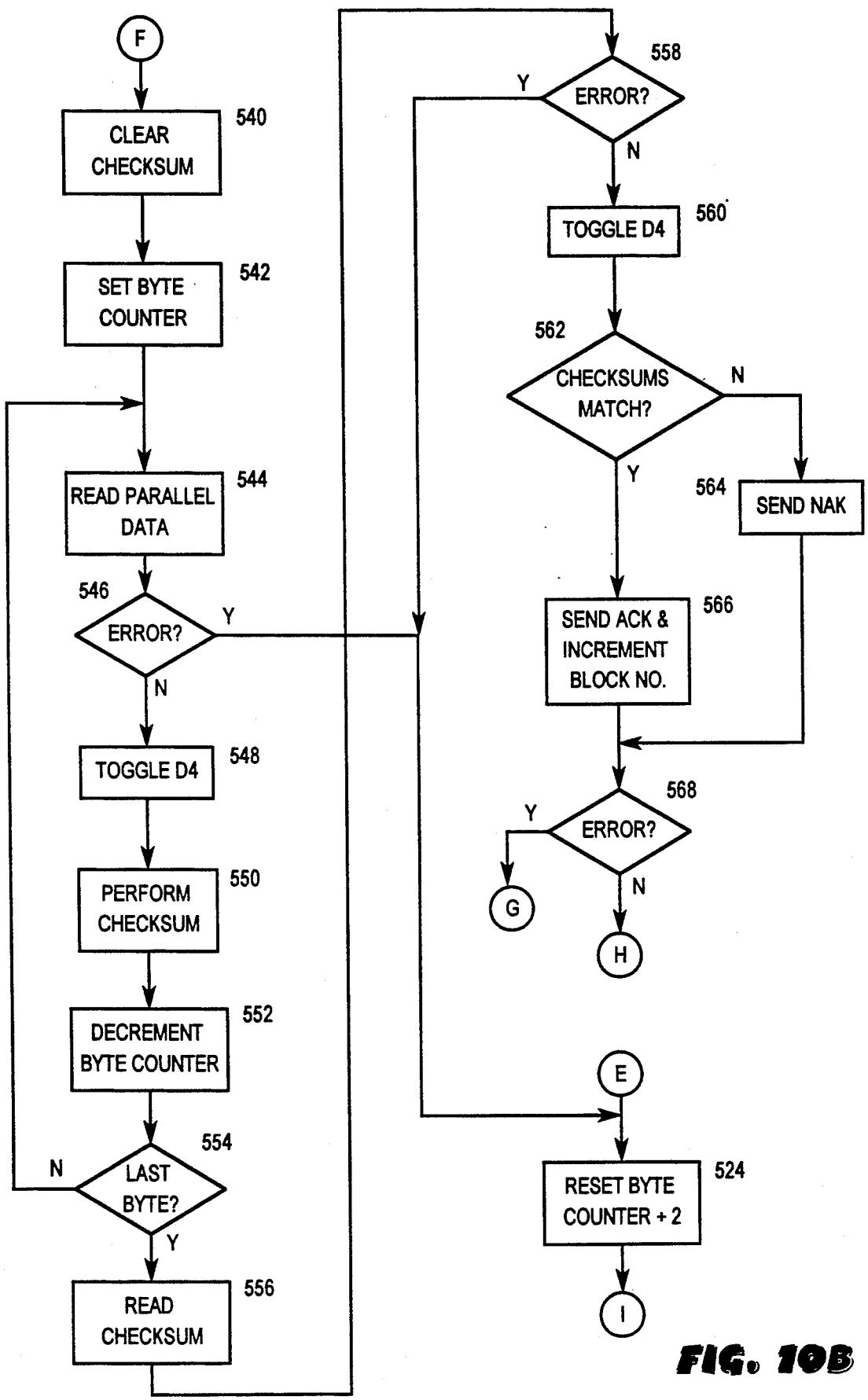

If an error did not occur as determined in step 522, control proceeds to step 526 where the D4 output is toggled. Control proceeds to step 528 where the complementary block number is read using the read parallel data sequence 800. If the error was obtained while reading this block as determined in step 530, control proceeds to step 524. If no error was developed, control proceeds to step 532 where the D4 output is toggled. Control then proceeds to step 534 to determine if the received block numbers, that is the true block number and the complementary block number, agree. If not, control proceeds to step 524. If they do check, control proceeds to step 536 to determine if the block number as indicated in the packet header agrees with a tracking block number in the target computer T2. If not, control proceeds to step 538 to determine if the received block number is the previous block number as indicated in the target computer T2. This may be the case when the block is being retransmitted because of errors. If not the previous block number, control returns to step 510 where an error flag is set and control is returned. If it is the proper block as determined in step 536, or the previous block as determined to be step 538, control proceeds to step 540 (FIG. 10B) where a checksum value location in the target computer T2 is cleared. Control proceeds to step 542 where a byte counter value is set to 128 bytes to indicate the length of the data packet to be received. Control proceeds to step 544 where the next byte of parallel data is read using the read parallel data sequence 800. If it is determined in the next step, which is step 546, that an error occurred, control proceeds to step 524. If no error occurred, control proceeds to step 548 where the D4 output is toggled. Control then proceeds to step 550 where the ongoing checksum is performed. Control proceeds to step 552 where the byte counter is decremented and to step 554 to determine if the last byte was obtained. If it was not the last byte, control returns to step 544.

If the last byte was obtained as determined in step 554, control proceeds to step 556 where the checksum is read using the read parallel data sequence 800. Control proceeds to step 558 after reading the checksum in step 560 to determine if an error occurred while reading the checksum byte. If so, control proceeds to step 524. If not, control proceeds to step 560 where the D4 output is toggled. Control then proceeds to step 562 where a determination is made as to whether the checksum value received over the link is equal to the checksum value that has been developed by the target computer T2. If not, control proceeds to step 564 where the NAK character code is transmitted by the send parallel byte sequence 700 to indicate that the packet is not acknowledged. If the checksums do match, control proceeds to step 566 where the ACK character code for acknowledgement is transmitted by the send parallel byte sequence 700 and the block number is incremented. Control proceeds from step 564 or step 566 to step 568 determine if any errors developed in the transmission sequence. If not, control returns to step 502 where the next packet is read. If errors did occur, control returns to step 510 where an error flag is set.

Figure 10C:
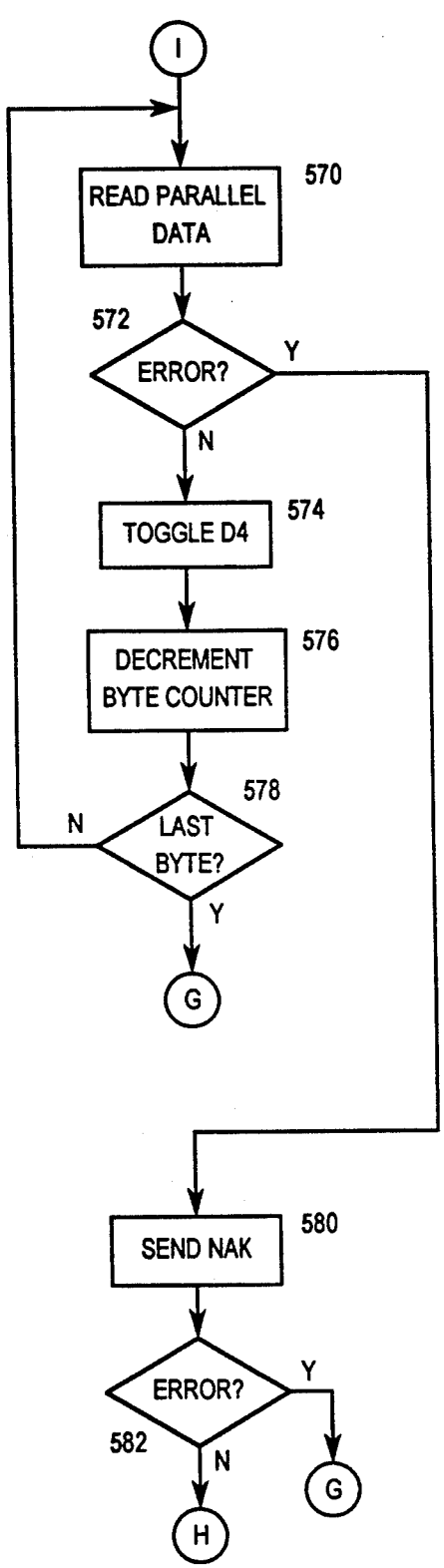

If the various timeout errors did occur while reading data, control has transferred to step 524. As previously indicated, step 524 resets the byte counter to a value larger than that of the packet to be received to allow completion of the packet. Control then transfers to step 570 (FIG. 10C) where the next byte of parallel data is read using the read parallel data sequence 800. If an error occurs in step 572, control proceeds to step 580, where the NAK or not acknowledged character code is transmitted using the send parallel byte sequence 700.

Control proceeds to step 582 to determine if an error occurred in this process. If not, control returns to step 502 to receive the next packet. If so, control proceeds to step 510 where an error is indicated.

If an error did not occur in step 572, control proceeds to step 574 where the D4 output is toggled to indicate to the host computer H2 that the byte is fully acknowledged. Control then proceeds to step 576 where the byte counter is decremented and control proceeds to step 578 to determine if the last byte was received. If not, control returns to step 570 to continue reading bytes. The decrement byte counter is implemented so that there is a guarantee of clearing the next packet header. If this was the last byte as determined in step 578, control returns to step 510 where an error flag is set.

The send parallel byte sequence 700 commences at step 702 where the first nibble of data is provided and driven out on the D0-D3 lines of the transmit computer T2. Control proceeds to step 704 where the state of the BUSY signal is evaluated. Control proceeds to step 706 where the D4 output is toggled to indicate to the host computer H2 that data is available. Control proceeds to step 708 to see if the BUSY signal of the target computer T2 has changed. If not, control proceeds to step 710 where an error flag is set after an interval and to step 712, which is a return from the sequence, to indicate that a timeout occurred without the host responding.

If the BUSY signal does change within a desired interval, control proceeds to step 714 where the second nibble of the desired parallel byte is transmitted. Control proceeds to step 716 where the state of the BUSY signal is interrogated and saved and to step 718 where the D4 output is toggled. Control proceeds to step 720 to see if the busy signal is changed to indicate an acknowledgement by the host computer H2. If it has not changed within an interval, control proceeds to step 710, while if it has changed, control proceeds to step 712.

The reading of parallel data during the actual data transfer is somewhat different as previously indicated from the reading of data during the identification sequence in that during the identification sequence the D4 output is not changed, while during the data sequence it is toggled to acknowledge to the host computer that the data has been accepted. The read parallel data sequence 800 commences at step 802 by setting a timeout value. Control proceeds to step 804 to determine if the BUSY signal is high. If not, control proceeds to step 806 to see if the timeout is completed. If not, control returns to step 804. If the timeout has completed, control proceeds from step 806 to step 808 where an error flag is set and then to step 810 which is a return to the calling sequence. If the BUSY signal was high in step 804, control proceeds to step 812 where the first nibble of data is read. Control proceeds to step 814 where the D4 output is toggled to indicate receipt of the first nibble. Control then proceeds to step 816 where a new timeout value is set. Following this setting of the timeout value, control proceeds to step 818 where the state of the BUSY signal is checked. If it is not low, control proceeds to step 820 to determine if the timeout has completed. If not, control returns to step 818. If the timeout has completed, control proceeds to step 808 where the error flag is set. If it is determined in step 818 that the BUSY signal is low prior to timing out, control proceeds from step 818 to step 822 where the second nibble is obtained and the full byte of data developed. Control then proceeds to step 810 which then provides the data to the calling sequence.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for providing boot information from a first computer to a second computer or from a floppy disk of the second computer, the method comprising:
   providing a communications path between the first and second computers;
   the first computer repetitively transmitting an identification sequence over the communications path;
   the second computer reading transmissions over the communications path without changing any of its outputs coupled to the communications path;
   the second computer analyzing the transmissions received over the communications path for a match to an identification sequence in the second computer;
   the second computer providing an acknowledgement signal to the first computer over the communications path after determining a match to the second computer's identification sequence;
   the first computer transferring boot information to the second computer over the communications path after acknowledgement by the second computer;
   the second computer executing the boot information received from the first computer; and
   the second computer attempting to obtain boot information from a floppy disk if boot information is not available over the communications path after a predetermined period of reading and analyzing transmissions.

2. The method of claim 1, wherein the first and second computers exchange boot information using the XMODEM protocol.

3. The method of claim 1, wherein the communications path potentially includes both a serial path and a parallel path, the first computer repetitively transmits over either path and the second computer analyzes first one path for a matching sequence and then the other path for a matching sequence if one is not found on the first path.

4. The method of claim 3, wherein information is communicated over the parallel path in nibble units.

5. The method of claim 4, wherein the parallel path includes a status output signal from the first computer to a status input on the second computer and an edge of the status output signal indicates transmission of a nibble of information by the first computer.

6. The method of claim 3, wherein the first computer repetitively transmits at one of a plurality of baud rates and the second computer scans the serial path at differing baud rates to determine if an identification sequence is being received.

7. The method of claim 1, wherein the first computer pauses between transmissions of characters forming the identification sequence to allow the second computer to provide said acknowledgement signal during the pause.

8. A system for providing boot information to a computer, comprising:
   a first computer having a communications port;
   a second computer having a communications port, said communications ports of said first and second computers being coupled to form a communications path to allow information transmission between said first and second computers;
   said first computer including means for repetitively transmitting an identification sequence to said second computer over said communications path;
   said second computer including means for analyzing transmissions received over said communications path without changing any outputs coupled to the communications path and for providing an acknowledgement signal to said first computer over said communications path after determining that the transmissions received over said communications path match an identification sequence in said second computer;
   said first and second computers further including means for transferring boot information from said first computer to said second computer over said communications path after said second computer provides said acknowledgement signal; and
   said second computer further including means for executing said boot information received from said first computer; and
   said second computer further including means for attempting to obtain boot information from a floppy disk if boot information is not available over said communications path after a predetermined period of analyzing received transmissions.

9. The system of claim 8, wherein said boot information transfer means utilize the XMODEM protocol.

10. The system of claim 8, wherein said first computer and said second computer communications ports may include both a serial port and a parallel ports, said means for repetitively transmitting utilizes either said serial port or said parallel port and said means for analyzing transmissions analyzes first one port for a matching sequence and then the other port for a matching sequence if one is not found on the first port.

11. The system of claim 10, wherein information is communicated over the parallel port in nibble units.

12. The system of claim 11, wherein the parallel port of said first computer includes a status output, the parallel port of said second computer includes a status input and an edge of said status output indicates transmission of a nibble of information by said first computer.

13. The system of claim 10, wherein, said means for repetitively transmitting transmits at one of a plurality of baud rates over said serial port and said means for analyzing utilizes differing baud rates of said serial port to determine if an identification sequence is being received.

14. The system of claim 8, wherein said repetitive transmission means provides pauses between portions of said identification sequence to allow said means for analyzing a period of time to provide said acknowledgement signal.

* * * * *

UNITED STATES PATENT AND TRADEMARK OFFICE
CERTIFICATE OF CORRECTION

PATENT NO.   : 5,325,529

DATED        : June 28, 1994

INVENTOR(S)  : Norman P. Brown, et al.

It is certified that error appears in the above-identified patent and that said Letters Patent is hereby corrected as shown below:

In col. 16, ln. 28, please delete "and".

Signed and Sealed this

Twenty-eight Day of March, 1995

Attest:

BRUCE LEHMAN

*Attesting Officer*     *Commissioner of Patents and Trademarks*